(12) United States Patent
Dimitrijevic et al.

(10) Patent No.: US 7,988,251 B2
(45) Date of Patent: Aug. 2, 2011

(54) METHOD AND SYSTEM FOR HIGH SPEED MULTI-PASS INKJET PRINTING

(75) Inventors: Ana Dimitrijevic, Yverdon-les-Bains (CH); Serge Cattarinussi, Yverdon-les-Bains (CH); Taha Baroud, Yverdon-les-Bains (CH)

(73) Assignee: Telecom Italia, S.p.A., Milano (IT)

( * ) Notice: Subject to any disclaimer, the term of this patent is extended or adjusted under 35 U.S.C. 154(b) by 373 days.

(21) Appl. No.: 12/307,547

(22) PCT Filed: Jul. 3, 2006

(86) PCT No.: PCT/EP2006/006486
§ 371 (c)(1),
(2), (4) Date: Jan. 5, 2009

(87) PCT Pub. No.: WO2008/003336
PCT Pub. Date: Jan. 10, 2008

(65) Prior Publication Data
US 2009/0315932 A1    Dec. 24, 2009

(51) Int. Cl.
*B41J 29/38* (2006.01)
*B41J 2/15* (2006.01)

(52) U.S. Cl. .......................... 347/12; 347/41

(58) Field of Classification Search ............... 347/9, 12, 347/13, 40–42
See application file for complete search history.

(56) References Cited

U.S. PATENT DOCUMENTS

| | | | |
|---|---|---|---|
| 5,790,150 A | 8/1998 | Lidke et al. | |
| 7,715,043 B2 * | 5/2010 | Billow et al. | 358/1.8 |
| 2001/0012033 A1 | 8/2001 | Ono et al. | |
| 2002/0126179 A1 | 9/2002 | Sato et al. | |

FOREIGN PATENT DOCUMENTS
EP    0865927 A2    9/1998

OTHER PUBLICATIONS

International Search Report for PCT/EP2006/006486 dated Mar. 28, 2007.

* cited by examiner

*Primary Examiner* — An H Do
(74) *Attorney, Agent, or Firm* — Venable LLP; Robert Kinberg

(57) ABSTRACT

A method of printing from a printhead includes virtually dividing a nozzle array of the printhead into first and second nozzle sections. N print masks associated with the first and second nozzle sections govern the deposition of ink drops on a print medium. The N print masks are associated with one swath and are defined as a mask grid. The mask grid is arranged as a series of vertically extending adjacent mask columns and a series of horizontally extending mask rows. The vertically extending mask columns comprise enabling mask columns comprising first mask elements and disabling mask columns consisting essentially of second mask elements. The N print masks are associated with the first and second nozzle sections for printing an input image. Each print mask is defined as a mask grid arranged in an N series of vertically extending adjacent mask columns and a series of Z horizontally extending mask rows. The series of mask rows are divided in first and second adjacent mask sections corresponding to the first and second nozzle sections, respectively. The mask rows of the second mask section are arranged spaced from one another by N−1 adjacent second mask elements and the mask rows of the first nozzle section are arranged spaced from one another by 2N−1 adjacent second mask elements within the same mask row.

10 Claims, 10 Drawing Sheets

$$M1 = \begin{pmatrix} 1 & 0 & 1 & 0 & 1 & 0 & 1 & 0 \\ 0 & 1 & 0 & 1 & 0 & 1 & 0 & 1 \\ 1 & 0 & 1 & 0 & 1 & 0 & 1 & 0 \\ 0 & 1 & 0 & 1 & 0 & 1 & 0 & 1 \\ 1 & 0 & 1 & 0 & 1 & 0 & 1 & 0 \\ 0 & 1 & 0 & 1 & 0 & 1 & 0 & 1 \\ 1 & 0 & 1 & 0 & 1 & 0 & 1 & 0 \\ 0 & 1 & 0 & 1 & 0 & 1 & 0 & 1 \end{pmatrix}$$

$$M2 = \begin{pmatrix} 0 & 1 & 0 & 1 & 0 & 1 & 0 & 1 \\ 1 & 0 & 1 & 0 & 1 & 0 & 1 & 0 \\ 0 & 1 & 0 & 1 & 0 & 1 & 0 & 1 \\ 1 & 0 & 1 & 0 & 1 & 0 & 1 & 0 \\ 0 & 1 & 0 & 1 & 0 & 1 & 0 & 1 \\ 1 & 0 & 1 & 0 & 1 & 0 & 1 & 0 \\ 0 & 1 & 0 & 1 & 0 & 1 & 0 & 1 \\ 1 & 0 & 1 & 0 & 1 & 0 & 1 & 0 \end{pmatrix}$$

FIG. 3

$$F_i = \begin{bmatrix} 0 & \cdot & 1 & 0 & \cdot & 0 & 0 & 0 & \cdot & 0 & 1 & 0 & \cdot & 0 & 0 & 0 & \cdot & 0 & 1 & 0 & \cdot \\ \cdot & & \cdot & \cdot & & \cdot & \cdot & \cdot & & \cdot & \cdot & \cdot & & \cdot & \cdot & \cdot & & \cdot & \cdot & \cdot & \\ 0 & \cdot & 1 & 0 & & 0 & 0 & 0 & \cdot & 0 & 1 & 0 & & 0 & 0 & 0 & \cdot & 0 & 1 & 0 & \cdot \\ 0 & \cdot & 1 & 0 & \cdot & 0 & 1 & 0 & \cdot & 0 & 1 & 0 & \cdot & 0 & 1 & 0 & \cdot & 0 & 1 & 0 & \cdot \\ \cdot & & \cdot & \cdot & & \cdot & \cdot & \cdot & & \cdot & \cdot & \cdot & & \cdot & \cdot & \cdot & & \cdot & \cdot & \cdot & \\ 0 & \cdot & 1 & 0 & \cdot & 0 & 1 & 0 & & 0 & 1 & 0 & \cdot & 0 & 1 & 0 & \cdot & 0 & 1 & 0 & \cdot \\ 0 & \cdot & 0 & 0 & & 0 & 1 & 0 & \cdot & 0 & 0 & 0 & & 0 & 1 & 0 & \cdot & 0 & 0 & 0 & \cdot \\ \cdot & & \cdot & \cdot & & \cdot & \cdot & \cdot & & \cdot & \cdot & \cdot & & \cdot & \cdot & \cdot & & \cdot & \cdot & \cdot & \\ 0 & \cdot & 0 & 0 & & 0 & 1 & 0 & \cdot & 0 & 0 & 0 & & 0 & 1 & \cdot & \cdot & 0 & 0 & 0 & \cdot \end{bmatrix}$$

- I-1 (top bracket)
- N, 2*N (bottom brackets)
- O rows, Z-2*O rows, O rows (right brackets)

FIG. 7

$$F_1 = \begin{bmatrix} 1 & 0 & 0 & 0 & 0 & 0 & 1 & 0 & 0 & 0 & 0 & 0 & 1 & 0 & 0 & \cdot \\ \cdot & \cdot & \cdot & \cdot & \cdot & \cdot & \cdot & \cdot & \cdot & \cdot & \cdot & \cdot & \cdot & \cdot & \cdot & \cdot \\ 1 & 0 & 0 & 0 & 0 & 0 & 1 & 0 & 0 & 0 & 0 & 0 & 1 & 0 & 0 & \cdot \\ 1 & 0 & 0 & 1 & 0 & 0 & 1 & 0 & 0 & 1 & 0 & 0 & 1 & 0 & 0 & \cdot \\ \cdot & \cdot & \cdot & \cdot & \cdot & \cdot & \cdot & \cdot & \cdot & \cdot & \cdot & \cdot & \cdot & \cdot & \cdot & \cdot \\ 1 & 0 & 0 & 1 & 0 & 0 & 1 & 0 & 0 & 1 & 0 & 0 & 1 & 0 & 0 & \cdot \\ 0 & 0 & 0 & 1 & 0 & 0 & 0 & 0 & 1 & 0 & 0 & 0 & 0 & 0 & 0 & \cdot \\ \cdot & \cdot & \cdot & \cdot & \cdot & \cdot & \cdot & \cdot & \cdot & \cdot & \cdot & \cdot & \cdot & \cdot & \cdot & \cdot \\ 0 & 0 & 0 & 1 & 0 & 0 & 0 & 0 & 1 & 0 & 0 & 0 & 0 & 0 & 0 & \cdot \end{bmatrix} \begin{matrix} \left.\vphantom{\begin{matrix}1\\1\\1\end{matrix}}\right\} \text{9 rows} \\ \left.\vphantom{\begin{matrix}1\\1\\1\end{matrix}}\right\} \text{111 rows} \\ \left.\vphantom{\begin{matrix}1\\1\\1\end{matrix}}\right\} \text{9 rows} \end{matrix}$$

$$F_2 = \begin{bmatrix} 0 & 1 & 0 & 0 & 0 & 0 & 0 & 1 & 0 & 0 & 0 & 0 & 0 & 1 & 0 & \cdot \\ \cdot & \cdot & \cdot & \cdot & \cdot & \cdot & \cdot & \cdot & \cdot & \cdot & \cdot & \cdot & \cdot & \cdot & \cdot & \cdot \\ 0 & 1 & 0 & 0 & 0 & 0 & 0 & 1 & 0 & 0 & 0 & 0 & 0 & 1 & 0 & \cdot \\ 0 & 1 & 0 & 0 & 1 & 0 & 0 & 1 & 0 & 0 & 1 & 0 & 0 & 1 & 0 & \cdot \\ \cdot & \cdot & \cdot & \cdot & \cdot & \cdot & \cdot & \cdot & \cdot & \cdot & \cdot & \cdot & \cdot & \cdot & \cdot & \cdot \\ 0 & 1 & 0 & 0 & 1 & 0 & 0 & 1 & 0 & 0 & 1 & 0 & 0 & 1 & 0 & \cdot \\ 0 & 0 & 0 & 0 & 1 & 0 & 0 & 0 & 0 & 1 & 0 & 0 & 0 & 0 & 0 & \cdot \\ \cdot & \cdot & \cdot & \cdot & \cdot & \cdot & \cdot & \cdot & \cdot & \cdot & \cdot & \cdot & \cdot & \cdot & \cdot & \cdot \\ 0 & 0 & 0 & 0 & 1 & 0 & 0 & 0 & 0 & 1 & 0 & 0 & 0 & 0 & 0 & \cdot \end{bmatrix} \begin{matrix} \left.\vphantom{\begin{matrix}1\\1\\1\end{matrix}}\right\} \text{9 rows} \\ \left.\vphantom{\begin{matrix}1\\1\\1\end{matrix}}\right\} \text{111 rows} \\ \left.\vphantom{\begin{matrix}1\\1\\1\end{matrix}}\right\} \text{9 rows} \end{matrix}$$

$$F_3 = \begin{bmatrix} 0 & 0 & 1 & 0 & 0 & 0 & 0 & 0 & 1 & 0 & 0 & 0 & 0 & 0 & 1 & \cdot \\ \cdot & \cdot & \cdot & \cdot & \cdot & \cdot & \cdot & \cdot & \cdot & \cdot & \cdot & \cdot & \cdot & \cdot & \cdot & \cdot \\ 0 & 0 & 1 & 0 & 0 & 0 & 0 & 0 & 1 & 0 & 0 & 0 & 0 & 0 & 1 & \cdot \\ 0 & 0 & 1 & 0 & 0 & 1 & 0 & 0 & 1 & 0 & 0 & 1 & 0 & 0 & 1 & \cdot \\ \cdot & \cdot & \cdot & \cdot & \cdot & \cdot & \cdot & \cdot & \cdot & \cdot & \cdot & \cdot & \cdot & \cdot & \cdot & \cdot \\ 0 & 0 & 1 & 0 & 0 & 1 & 0 & 0 & 1 & 0 & 0 & 1 & 0 & 0 & 1 & \cdot \\ 0 & 0 & 0 & 0 & 0 & 1 & 0 & 0 & 0 & 0 & 0 & 1 & 0 & 0 & 0 & \cdot \\ \cdot & \cdot & \cdot & \cdot & \cdot & \cdot & \cdot & \cdot & \cdot & \cdot & \cdot & \cdot & \cdot & \cdot & \cdot & \cdot \\ 0 & 0 & 0 & 0 & 0 & 1 & 0 & 0 & 0 & 0 & 0 & 1 & 0 & 0 & 0 & \cdot \end{bmatrix} \begin{matrix} \left.\vphantom{\begin{matrix}1\\1\\1\end{matrix}}\right\} \text{9 rows} \\ \left.\vphantom{\begin{matrix}1\\1\\1\end{matrix}}\right\} \text{111 rows} \\ \left.\vphantom{\begin{matrix}1\\1\\1\end{matrix}}\right\} \text{9 rows} \end{matrix}$$

FIG. 8

METHOD AND SYSTEM FOR HIGH SPEED MULTI-PASS INKJET PRINTING

FIELD OF THE INVENTION

This invention generally relates to a system and a method for printing of text or graphics on printing media such as paper or other glossy media, such as photo-quality paper.

BACKGROUND OF THE INVENTION

Ink jet printers commonly include one or more printheads which are mounted on a carriage assembly. The carriage assembly is moveable in a transverse direction (generally perpendicular) relative to an advance direction of a print medium such as paper. As the printhead moves across the surface of the print medium during a particular pass, ink is selectively ejected from a plurality of nozzles pursuant to commands from a microcomputer or other controller and deposited on the print medium at corresponding ink dot placement locations, called pixels, in the image of the print medium. The image created from individual ink dots on the printing medium result in a two-dimensional pixel array, which can be referred to as the image bitmap.

Many conventional high-quality inkjet printers use a swath-by-swath approach. The band of colored ink drops printed at a time is generally referred to as the "swath". Typically, four different color inks (cyan, magenta, yellow, and black) are used by the printer to print the range of colors contained in the image. By printing successive swaths, the image is completely formed on the print medium. Each swath extends across the entire width of the image bitmap, e.g., corresponding to the printed image area across a page. The vertical size of the swath is at most the size of the printhead, but it can be smaller, as described more in detail in the following.

Typically, ink jet printers use a variety of different print modes to control the quality and speed of printing. In one pass printing, each horizontal motion of the printhead across the print medium is used to print a portion of the image bitmap in one single scan. This print mode is fastest, but it can result in print quality defects, particularly at swath boundaries. Such defects appear periodically on the printed image and they are commonly known as "banding defects".

To improve print uniformity, multi-pass printing mode is employed by printing overlapping swaths having a partial printing density in a process known as "shingling." During the typical two-pass shingled printing, each swath prints only every other dot in a final image line, and the resulting fully printed image bitmap will have been printed with ink contributed by two passes of the print head. Three- or four-pass shingling follows the same principle, providing even better print quality with slower printing speed. In multi-pass printing mode, the distance between the top scan line of a swath and the swath following is a distance less than the height of the swath.

As the printing mode may have a number of parameters, such as the number of passes required to fill an image area and the enabled position of the ink droplets at every pass, i.e., the pixel locations to be filled, a digital matrix is generally created to define each position of each pass in which a drop may print. The matrix is called the print mask. The print mask then determines exactly which pixels are printed and which are not on each pass of the print head.

For instance, in four-pass printing mode, a ¼ filled printing mask can be employed in each pass with an advancement of ¼ of the swath length after each pass.

U.S. Pat. No. 6,764,162 describes a method for reducing inkjet printer banding effects which provides a shingle mask that creates a smooth accumulated shingle mask distribution, which will tend to eliminate the sharp transition regions that create the banding characteristics of inkjet printers.

In some types of printheads, it is common that nozzles located at the top and the bottom of the printhead exhibit significant dot placement errors in the advancement direction if compared to the nozzles at the central portion of the printhead. A multi-pass printing mode can be insufficient to improve print quality to an acceptable level, especially when specific groups of nozzles have worse errors than other groups of nozzles.

U.S. Pat. No. 6,310,640 discloses a system including a print controller which activates the nozzles to deposit the ink onto a medium during multiple printing passes, as governed by a printmask. The printmask has a mask pattern that allows some of the nozzles to deposit drops of the ink in fewer possible pixel locations of the row in each printing pass, and allowing others of the nozzles to deposit the drops of the ink in more possible pixel locations of the corresponding ones of the rows in each printing pass. The fewer and more locations are relative to printing a substantially equal number of possible pixel locations on a row with all nozzles.

U.S. Pat. No. 6,375,307 discloses an inkjet printing apparatus having a printhead comprising a plurality of nozzles arranged along a printhead axis, the printing apparatus being arranged to print swaths which overlap the neighbouring swaths by a fraction of the swath width, wherein only one edge region of each swath which overlaps the neighbouring swaths has a reduced print density relative to its remaining regions.

SUMMARY OF THE INVENTION

The present invention relates to a high speed printing method to form an image in a plurality of printing passes, each pass corresponding to a swath. According to a preferred embodiment, the method comprises the step of generating print masks with a repetitive portion of mask columns consisting essentially of mask elements that disable pixel locations from being filled with ink dots. Such printing masks when applied to the input image data, create masked image data comprising data columns free of data, which can be removed to form print image data, thereby allowing a faster print carriage speed.

According to a first aspect, the present invention relates to a method according to claim 1.

According to a second aspect, the present invention relates to a method of printing according to claim 22.

BRIEF DESCRIPTION OF THE DRAWING

FIG. 3 illustrates two print masks which determine the image bitmap FIG. 2*b* and FIG. 2*c*, respectively.

FIG. 7 illustrates a print mask associated to a swath of a multi-pass printing using an "anti-banding" shingling.

FIG. 8 illustrates an example of three print masks for a multi-pass printing using an "anti-banding" shingling.

DETAILED DESCRIPTION

Figure 1A:
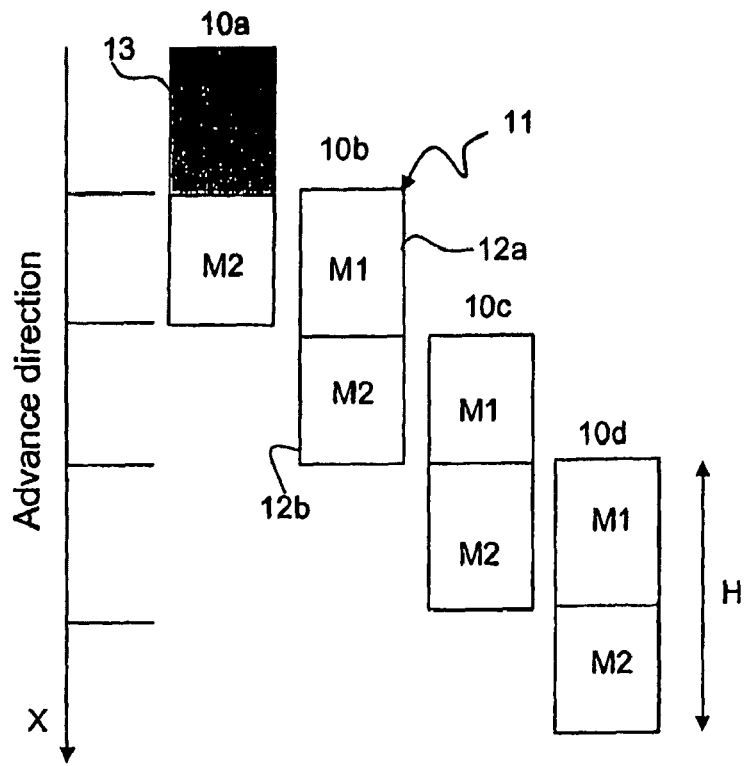
FIG. 1*a* is a schematic diagram illustrating vertical positions of nozzle arrangement of a printhead over a print medium during successive printing passes for a "standard" shingling known in the art.

FIG. 1a is a schematic diagram illustrating four vertical positions 10a-d of the nozzle arrangement 11 of a printhead over a print medium during successive printing passes for a "standard" shingling. In the example of FIG. 1a, a shingling mode equal to 2 is shown, wherein the printhead between each pass advances of half of the height H of the printhead and during each pass the nozzles of the printhead print with 50% of the printing density. In the following discussion, the height of the printhead is assumed to correspond to the height of the nozzle arrangement of printing nozzles. Section 13 of vertical position 10a indicates the "entry phase" of the printing of a document, which results in an incomplete image bitmap corresponding to that section.

Figure 1B:
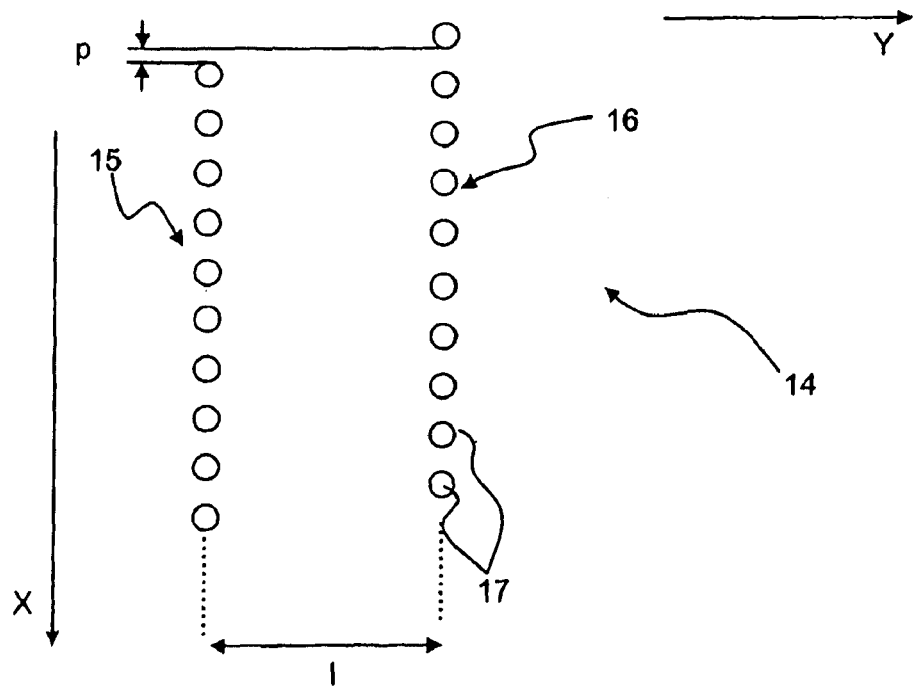
FIG. 1*b* diagrammatically shows a simplified example of a nozzle arrangement.

FIG. 1b diagrammatically shows a simplified example of nozzle arrangement 14 in which nozzles 17 are arranged in two substantial parallel lines 15 and 16 which are separated from each other of a distance I perpendicular to the nozzle lines. The two parallel lines can be adjacent to two opposite side of an ink feed slot (not shown) of the printhead. Along the direction of the nozzle lines 15 and 16, the two lines are spaced from each other by elementary pitch "p" which defines the vertical resolution of the printhead, e.g., p of about 85 µm (1/300ths of an inch) corresponds to a resolution of 300 dot-per-inch (DPI). In the following, the vertical resolution defined by the nozzle density will be referred to as the native resolution of the printer.

Since the printhead moves in a direction (along the Y axis) transverse to the advance direction X of the print medium, each nozzle passes in a linear manner over the print medium. The line associated with each dot formed by the nozzles which are deposited on the print medium during a pass is referred to as a raster line or a document line.

Herein, with shingling mode, which will be indicated in the following with integer number N. it is meant the number of passes used to complete a document line. When applying a "standard" shingling mode, as that described with reference to FIG. 1a, in a shingling mode N, each document line is completed by N passes.

Figure 2A:
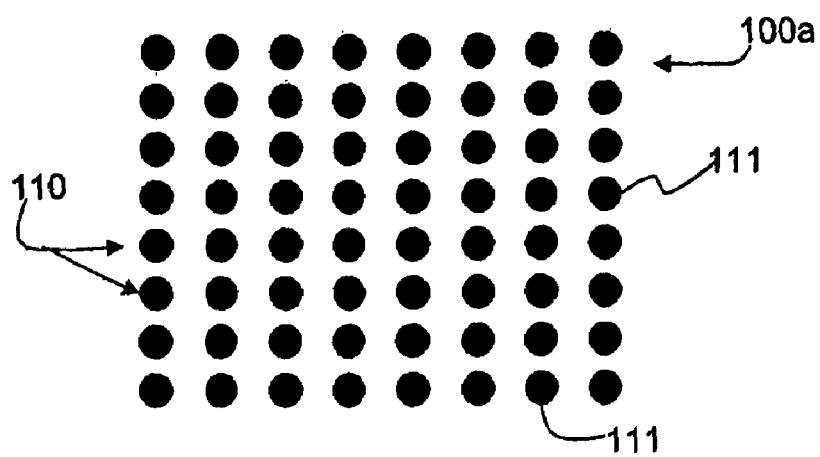
FIGS. 2*a*, 2*b* and 2*c* show the printing result which is obtained by using a "standard" shingling method for printing a complete pixel grid of ink dots.
Figure 2B:
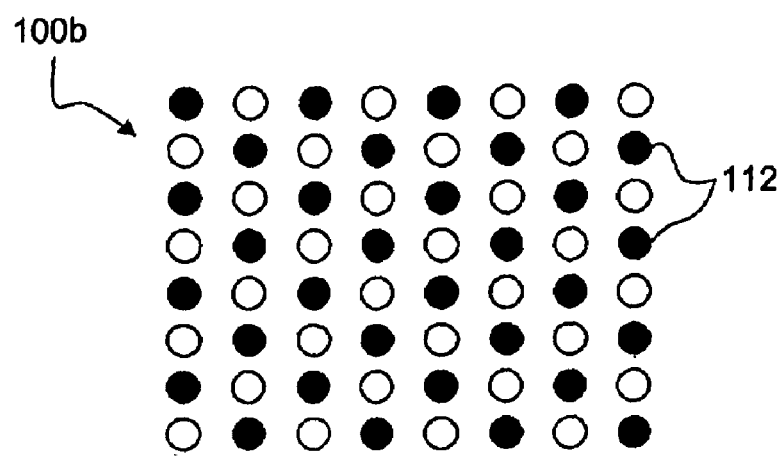
Figure 2C:
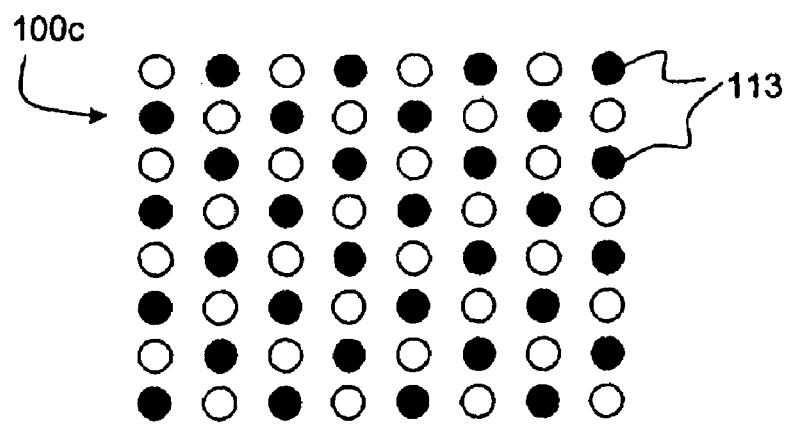

The mode of operation involved for printing on a print medium, e.g., paper, an image bitmap using a shingling mode of 2 schematically illustrated in FIG. 1a is briefly described with reference to FIGS. 2a-c. FIG. 2a shows an example of a simplified two-dimensional ink dot pixel grid (i.e., image bitmap) 100a arranged by pixel rows and pixel columns having a printing density of 100%. For sake of clarity, only an array of 8 rows 110 of 8 pixel locations 111 are illustrated and it is assumed for clarity that all pixel locations of the image bitmap are filled with ink dots. The image bitmap 100a will be printed completely (i.e., all pixel locations 111 are filled with ink dots) by two passes of the printhead. The first pass produces a first swath 100b (FIG. 2b) in which the nozzles emit the ink dots alternately only with a first half of pixel locations 112 (i.e., printing density of 50%). After the print medium is advanced by half of the height of the printhead, the second pass produces a second swath 100c in which nozzles emit the ink drops in the second half of the pixel locations 113, which are complementary with respect to the first half.

Emission of ink dots on the print medium at each swath is governed by print masks that define the pattern of ink droplet deposition. A binary print mask is defined as a matrix of rows and columns comprising mask elements "1" and mask elements "0", wherein the "j" element corresponds to an enabled pixel location (i.e., an ink dot enabled to be printed) and "0" element corresponds to a disabled pixel location (i.e., an empty ink dot).

FIG. 3 illustrates two print masks, M1 and M2, which determine the image bitmap 100b (FIG. 2b) and 100c (FIG. 2c), respectively. The two print masks M1 and M2 are complementary. Referring now back to FIG. 1a and disregarding for the moment step 10a that comprises the entry phase, in the step corresponding to the vertical position 10b, the input image data for printing one pass is stored in a printing buffer and mask M1 is applied to the first half of the data, whereas mask M2 is applied to the second half of the input image data. Application of a print mask on image data typically comprises a binary logical operation AND between the image data and the print mask. The first half of the data corresponds to the pixel locations printed by the upper half of the printhead 12a, whereas the second half of the data correspond to the pixel locations printed by the lower half of the printhead 12b. Therefore, each pass produces a portion of the completed pixel grid having a printing density of less than 100%, said portion being obtained by applying more than one mask (in the example of FIG. 3, two masks are applied at each pass).

The print mechanism of inkjet printers is usually provided with an encoder for detecting the speed of movement of the carriage assembly mounting the printhead(s), wherein said encoder generates a sequence of encoder signals, which is representative of the speed of the carriage across the print medium along the scan direction, i.e., the printhead or carriage speed. By setting a given printhead speed, the encoder generates an encoder signal at regular time intervals in correspondence with the position on the print medium where the ink dot columns of the image bitmap have to be printed. Each encoder signal is transferred to the actuation electronics that creates a trigger signal for initiating firing of an ink dot column.

With the same carriage speed, the increased quality of multi-pass printing with shingling mode N comes at price of an N increase in print time. Since in multi-pass printing the nozzles can be programmed to skip certain pixel locations on certain passes, in principle the printing speed could be increased. For instance, in a shingling mode N=2, the printing speed could be doubled over a single pass.

However, the Applicant has observed that increasing the printhead speed may result in an overlap of printed columns in the image bitmap. Nozzle array in a printhead has been depicted in FIG. 1b in a simplified manner as two interspaced vertical nozzles columns. However, in most printheads, the nozzles of each vertical column are not exactly vertically aligned, but they are divided in groups of nozzles, each group being horizontally spaced (i.e., along the scan axis Y) so that nozzles within the group are physically staggered relative to each other. Staggered nozzles are fired sequentially at a time interval, δt (e.g., δt=2-4 μs), between the fire of a nozzle and the successive nozzle within the group. Increasing the printing speed implies a time "compression" of the staggering of the nozzle groups within the nozzle array. When a trigger signal is generated, a sequence of fire signals addressing sequentially the nozzles of the groups in the nozzle array is initiated. For instance, printheads may have nozzle arrays including 150 nozzles or more divided in groups of 15-20 nozzles, and thus the time interval, Δt, between trigger signals cannot be smaller than nδt, where n is the number of nozzles of a group. Reduction of the time interval Δt may be not possible due to the physical layout of the nozzle arrangement or to the fact that the time interval of the firing sequence δt cannot be further compressed. Therefore, by applying a mask pattern as that described with reference to FIG. 2, the increase of the printing speed may have the consequence that the sequence of ink drops within groups of a printed column of the image bitmap in part falls on top of the next column to be printed and therefore a new firing sequence in correspondence to the next column cannot start.

The Applicant has found that, in multi-pass printing having shingling mode N, by associating one print mask to each swath (i.e., each print mask is directed to all pixel locations of the image bitmap) it is possible to define the one print mask to have a printing density such that mask columns of enabled pixel locations are spaced one another by (N−1) mask columns of disabled pixel locations. This implies that the printing density of the swath associated to that one print mask is such that pixel columns of printed dots are spaced one another by (N−1) pixel columns of white space. The Applicant has realized that the printing process can be then carried out by addressing at each pass the nozzle array(s) with a sequence of trigger signals having a certain time interval, Δt, between successive signals and by setting a printhead speed so that each trigger signal of said sequence addresses only the columns of printed dots, i.e., each trigger signals addresses only one column every N columns of the image bitmap. In other words, if the space between two adjacent pixel columns of the image bitmap is d (e.g., d=1/1200') and pixel columns are assumed to be equally spaced, the average printhead speed, v, should be selected to be v=N·d/Δt, where N is the shingling mode. In this way, only the columns containing ink dots are printed while the empty columns are skipped, thereby significantly increasing the printer throughput without any significant loss of the printing quality.

Figure 4:
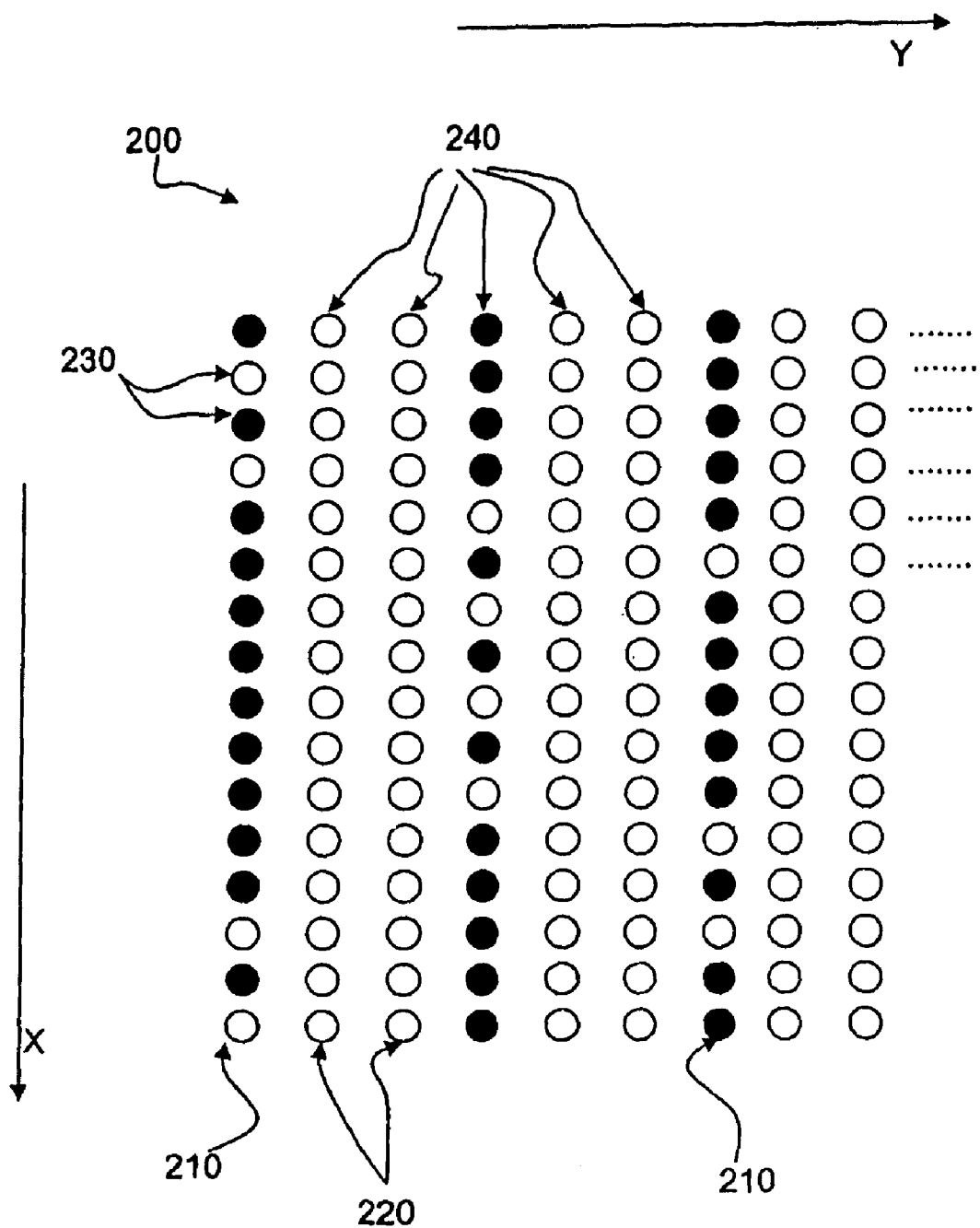
FIG. 4 shows the printing result which is obtained by using a first embodiment of a method of the present invention for printing a swath with shingling mode N=3.

FIG. 4 shows an example of a printing result which is obtained by using a first embodiment of a method of the present invention for printing a swath. In the example, the swath is printed by using a shingling mode N=3. A pixel grid 200 is made of a series of vertically extending (i.e., along the X-axis) adjacent pixel columns 240 and a horizontally extending series of raster lines 230 (i.e., along the Y-axis), said adjacent pixel columns being spaced apart by a column spacing d, which corresponds to the horizontal resolution of the document (e.g., 1200 DPI). Only one over three pixel columns, namely columns 210, contain enabled pixel locations (i.e., printed ink dots). Pixel columns 210 containing enabled pixel locations are spaced apart by 2 adjacent pixel columns 220 having only disabled pixel locations. Since whether or not an ink dot will be actually printed on a pixel location depends on whether the image bitmap to be printed requires that an ink dot of a certain ink color in that pixel position, pixel columns 210 may contain also disabled pixel locations. In order to complete the printing of the image bitmap, each raster line will be passed over three times, i.e., it will be printed by three nozzles. Between each pass, the print medium is advanced along the X axis by ⅓ of the printhead height.

According to a preferred embodiment of the present invention, a printhead with Z nozzles is considered and a multi-pass printing mode in which an N shingling mode are used to create an image bitmap having a printing density of 100%. It is now assumed that the process of printing is set to the native resolution of the printhead. When a shingling mode N is selected, N print masks, $\{F_1, F_2, \ldots, F_N\}$, are created, wherein each mask, $F_i$ (i=1,2, . . . N), is associated to a swath with the condition that the N-masks are complementary so that, after N swaths, the whole image bitmap is printed. It is emphasized that each print mask is associated to the whole image bitmap and has a printing density that depends on the shingling mode, with the condition that the sum of the printing densities of the N masks should be 100%. Preferably, the printing density of each mask is 100%/N. Each mask is represented by a binary matrix having Z rows so that each j-th row of the matrix corresponds to the j-th nozzle, where j=1,2, . . . , Z. The number of columns is defined by the scan width across the print medium, i.e., the swath width. It is to be noted that within the present formalism the number of nozzles, Z, is equivalent to the height, H, of the printhead; in other words the distance between nozzles in the nozzle array(s) (which is equivalent to pitch "p") is considered to be to 1. Namely, Z·p=H; if p=1, Z·p=Z.

In order to deposit the required amount of ink in all pixel locations of the image bitmap after N swaths, the following conditions should be satisfied:

a1) between each pass, the print medium is advanced by a distance $a_i$ (i=1,2, . . . N) selected so that the sum of the N advances is equal to the height of the printhead, namely $$\sum_{i=1}^{N} a_i = Z \quad (1)$$

b1) after completion of N-passes, each line of the image bitmap has been printed in N passes by using N different masks, $F_1$ to $F_N$, in any order.

When printing with an N shingling mode, N different nozzles are employed to print each raster line.

The Applicant has found that, by associating one print mask to each swath (i.e., each print mask addresses all pixel locations of the image bitmap), it is possible to define a set of complementary masks wherein each mask of the set is arranged so that all nozzles producing the image bitmap write on the same columns of the bitmap. A binary print mask comprising enabling mask columns of mask elements "1", i.e., corresponding pixel locations that are enabled for printing, which are spaced one another by (N−1) disabling mask columns consisting essentially of mask elements "0", corresponding to pixel locations that are disabled from printing, is associated to each swath. Within this context, "consisting essentially of" means that a very small percentage of "1" mask elements, i.e., not larger than 1-3% of the total number of mask elements within a mask column, in the disabling mask columns may be present. However, as it will become clearer from the following, a presence of "1" mask elements in the disabling mask columns may affect the quality of the final printed image and therefore, preferably, the disabling mask columns consist of only mask elements "0". In the following discussion, the preferred embodiments and examples relate to print masks comprising disabling mask columns consisting of mask elements corresponding to disabled pixel locations.

In general, for a shingling mode N, each print mask, $F_i$ (i=1,2, ... N), is defined as in the following:

$$F_i = \begin{bmatrix} 0 & \ldots & 1 & 0 & \ldots & 0 & 1 & 0 & \ldots & 0 & 1 & 0 & \ldots & 0 & 1 & \ldots \\ 0 & \ldots & 1 & 0 & & 0 & 1 & 0 & \ldots & 0 & 1 & 0 & & 0 & 1 & \ldots \\ 0 & \ldots & 1 & 0 & & 0 & 1 & 0 & \ldots & 0 & 1 & 0 & & 0 & 1 & \ldots \\ \ldots & & & & \ldots & \ldots & \ldots & & & \ldots & \ldots & \ldots & & & & \\ \ldots & & & & \ldots & \ldots & \ldots & & & \ldots & \ldots & \ldots & & & & \\ \ldots & & & & \ldots & \ldots & \ldots & & & \ldots & \ldots & \ldots & & & & \\ 0 & \ldots & 1 & 0 & & 0 & 1 & 0 & \ldots & 0 & 1 & 0 & & 0 & 1 & \ldots \\ 0 & \ldots & 1 & 0 & \ldots & 0 & 1 & 0 & \ldots & 0 & 1 & 0 & & 0 & 1 & \ldots \\ 0 & \ldots & 1 & 0 & & 0 & 1 & 0 & \ldots & 0 & 1 & 0 & & 0 & 1 & \ldots \end{bmatrix} \quad (2)$$

with columns $i-1$ and $N$ indicated.

The matrix of Eq. (2) has Z rows that correspond to the number of nozzles. For instance, if N=4, for each mask, $F_i$ (i=1,2,3,4), only one column every four contains data corresponding to enabled pixel positions. The first enabling mask column is the (i−1) mask column for mask $F_i$.

Since each print mask includes columns wherein all pixel positions are disabled, those columns can be assumed to be free of data. This turns out to be very important for the printing speed.

During the printing process, due to the substantial vertical alignment of the nozzles in the head (apart from a possible offset along the scan line due to the staggering), a trigger signal (or strobe) initiates the firing of each document column. Since the triggering frequency, i.e., the time interval between two successive trigger signals, Δt, is in general limited by the hardware of the printhead (and of the driver) or by the layout of nozzles due to staggering, this may represent an important limiting factor to the printing speed.

By defining the set of print masks in multi-pass printing according to the present invention, and in particular by knowing that, for each $F_i$, (N−1) columns every N columns are free of data, it is possible to remove them from the image data to be printed, as it will be explained more in detail in the following. The Applicant has found that, while keeping unchanged the trigger frequency during printing, it is possible to address all nozzles only in correspondence to the "1" columns by increasing the carriage speed by a factor of N. This makes possible the use of a multi-pass printing mode (e.g., shingling modes 2 or 4), thereby increasing the print quality, without any significant loss in printing speed with respect to a printing mode having no shingling.

Preferably, the print masks have equally spaced adjacent mask columns.

Inkjet printers typically have native vertical resolution of 300 or 600 dpi, with enhanced vertical resolutions of 1200 dpi or larger being generally available. Enhancement of the vertical resolution is achieved by printing more than one pass while interlacing the ink dot rows (i.e., raster lines), a method that is also referred to as "interlace printing". After one or more passes, the print head is moved in increments of distance along the advance direction of the print medium equal to a non-integer number of the pitch in order to achieve the aforementioned interlaced printing. A relative vertical resolution, R, of the printer is defined as the ratio between the desired resolution on the document (i.e., on the print medium), $R_{doc}$, and the native resolution of the printhead, $R_{head}$.

When considering the vertical resolution of the inkjet printer, the number of M passes is determined by the shingling mode, N, and the relative resolution, namely M=N·R. Obviously, M≧N, where M=N when the resolution is equal to the native resolution of the printhead. Is it to be noted that in equation M=N·R, N gives the number of shingling passes to print raster lines while R gives the number of interlaced passes needed to complete the image bitmap corresponding to the printhead height.

In order to deposit the required amount of ink in all pixel locations of the image bitmap in M passes, a2) between each pass, the print medium is advanced by a distance $a_m$ (m=1,2,... M) selected so that the sum of the M advances is equal to the height of the printhead expressed in the document resolution, namely $$\sum_{m=1}^{M} a_m = Z \cdot R \quad (3)$$

b2) after completion of M-passes, each line of the image bitmap (i.e, the raster line) has been printed in N passes by using N different masks, $F_1$ to $F_N$, in any order.

If M>N, a print mask, $F_i$ (i=1, ... ; N), is applied more than once in interlaced printing mode, namely each mask is applied R times. A set of masks corresponds to a sequence of advances, $a=\{a_1, \ldots, a_M\}$, which can be represented by mask indices $\alpha_m$ at each pass m, namely to each pass m mask $F_{\alpha_m}$ is associated.

Following condition a2), the sequence of advances $a=\{a_1, \ldots, a_M\}$ is the solution of the following matrix equation $$a = D \cdot (z + \omega) \quad (4)$$

wherein D is the M×M matrix defined as:

$$D_{(M,M)} = \begin{pmatrix} 1 & 0 & 0 & \ldots & 0 & 0 & 0 \\ -1 & 1 & 0 & 0 & \ldots & 0 & 0 \\ 0 & -1 & 1 & 0 & \ldots & \ldots & 0 \\ \ldots & 0 & -1 & \ldots & \ldots & 0 & \ldots \\ 0 & \ldots & \ldots & \ldots & 1 & 0 & 0 \\ 0 & 0 & \ldots & 0 & -1 & 1 & 0 \\ 0 & 0 & 0 & \ldots & 0 & -1 & 1 \end{pmatrix} ; \quad (5)$$

z is a vector of dimension M with elements $z_m$ equal to $$z_m = \left\lfloor \frac{Z}{N} m - m \right\rfloor, \, m = 1, 2, \ldots, M, \quad (6)$$

where $\lfloor x \rfloor$ is the operator that returns the largest integer below real number x and $\omega_m$=m with m=1 2, ... M.

The sequence of mask indices, $\alpha_m$, is given by the following equation $$\alpha_m = \left\lfloor \frac{\omega_m - 1}{R} - 1 \right\rfloor \quad (7)$$

At pass m, a swath is printed by using print mask $F_{\alpha_m}$ and, when the swath is completed, the print medium is advanced by a distance $a_m$.

The Applicant has observed that, in order to fulfill the above described conditions a1) or a2), it is not necessary that advances, $a_m$, are constant, i.e., that the print medium is advanced by the same distance between passes. The present printing process can employ any advance, $a_m$, as long as conditions a2) (or a1) is satisfied. By referring to the mathematical representation of Equations (4) to (6), an uneven paper advance means that the values $\omega_j$ for $j=1,2,\ldots M-1$ can be shuffled so as to result in a different sequence of uneven paper advances.

The definition of a regular sequence of advances can set a limitation on the selection of the parameters Z, N, and R so as even advances cannot be applied for any printing condition. According to the present printing process, for any group of parameters Z, N, and R, it is possible to select a suitable set of advances among a large group of possible sequences, because the constraint of defining an even advance is not necessary. For instance, selection of a suitable sequence of advances may take into account mechanical errors in paper advance of the printer or nozzle defects in order to define the optimum advance to minimize the effect of those errors or defects.

EXAMPLE 1

A vertically interlaced multi-pass printing mode having N=3 and R=2 and using a printhead comprising at least a column of 129 writing nozzles (Z=129) is considered. An even print medium advance is considered, where $m=1,2,\ldots,6$. The following three complementary print masks, $\{F_1, F_2, F_3\}$, each of 129 rows, are defined:

$$F_1 = \begin{bmatrix} 1 & 0 & 0 & 1 & 0 & 0 & 1 & 0 & 0 & 1 & 0 & 0 & 1 & 0 & 0 & \ldots \\ 1 & 0 & 0 & 1 & 0 & 0 & 1 & 0 & 0 & 1 & 0 & 0 & 1 & 0 & 0 & \ldots \\ 1 & 0 & 0 & 1 & 0 & 0 & 1 & 0 & 0 & 1 & 0 & 0 & 1 & 0 & 0 & \ldots \\ \ldots & \ldots & \ldots & \ldots & \ldots & \ldots & \ldots & & & & \ldots & \ldots & \ldots & & \\ \ldots & \ldots & \ldots & \ldots & \ldots & \ldots & \ldots & & & & \ldots & \ldots & \ldots & & \\ \ldots & \ldots & \ldots & \ldots & \ldots & \ldots & \ldots & & & & \ldots & \ldots & \ldots & & \\ 1 & 0 & 0 & 1 & 0 & 0 & 1 & 0 & 0 & 1 & 0 & 0 & 1 & 0 & 0 & \ldots \\ 1 & 0 & 0 & 1 & 0 & 0 & 1 & 0 & 0 & 1 & 0 & 0 & 1 & 0 & 0 & \ldots \\ 1 & 0 & 0 & 1 & 0 & 0 & 1 & 0 & 0 & 1 & 0 & 0 & 1 & 0 & 0 & \ldots \end{bmatrix} \quad (8)$$

$$F_2 = \begin{bmatrix} 0 & 1 & 0 & 0 & 1 & 0 & 0 & 1 & 0 & 0 & 1 & 0 & 0 & 1 & 0 & \ldots \\ 0 & 1 & 0 & 0 & 1 & 0 & 0 & 1 & 0 & 0 & 1 & 0 & 0 & 1 & 0 & \ldots \\ 0 & 1 & 0 & 0 & 1 & 0 & 0 & 1 & 0 & 0 & 1 & 0 & 0 & 1 & 0 & \ldots \\ \ldots \\ \ldots \\ \ldots \\ 0 & 1 & 0 & 0 & 1 & 0 & 0 & 1 & 0 & 0 & 1 & 0 & 0 & 1 & 0 & \ldots \\ 0 & 1 & 0 & 0 & 1 & 0 & 0 & 1 & 0 & 0 & 1 & 0 & 0 & 1 & 0 & \ldots \\ 0 & 1 & 0 & 0 & 1 & 0 & 0 & 1 & 0 & 0 & 1 & 0 & 0 & 1 & 0 & \ldots \end{bmatrix}$$

$$F_3 = \begin{bmatrix} 0 & 0 & 1 & 0 & 0 & 1 & 0 & 0 & 1 & 0 & 0 & 1 & 0 & 0 & 1 & \ldots \\ 0 & 0 & 1 & 0 & 0 & 1 & 0 & 0 & 1 & 0 & 0 & 1 & 0 & 0 & 1 & \ldots \\ 0 & 0 & 1 & 0 & 0 & 1 & 0 & 0 & 1 & 0 & 0 & 1 & 0 & 0 & 1 & \ldots \\ \ldots \\ \ldots \\ \ldots \\ 0 & 0 & 1 & 0 & 0 & 1 & 0 & 0 & 1 & 0 & 0 & 1 & 0 & 0 & 1 & \ldots \\ 0 & 0 & 1 & 0 & 0 & 1 & 0 & 0 & 1 & 0 & 0 & 1 & 0 & 0 & 1 & \ldots \\ 0 & 0 & 1 & 0 & 0 & 1 & 0 & 0 & 1 & 0 & 0 & 1 & 0 & 0 & 1 & \ldots \end{bmatrix}$$

With reference to Eq. (4), $\omega=\{1,2,3,4,5,6\}$. The vector representing the set of advances necessary to print the image bitmap is $a=\{43,43,43,43,43,43\}$. By applying Eq. (7), the vector representing the mask indices, $\alpha_m$, is $\alpha=\{1,1,2,2,3,3\}$.

EXAMPLE 2

Figure 5:
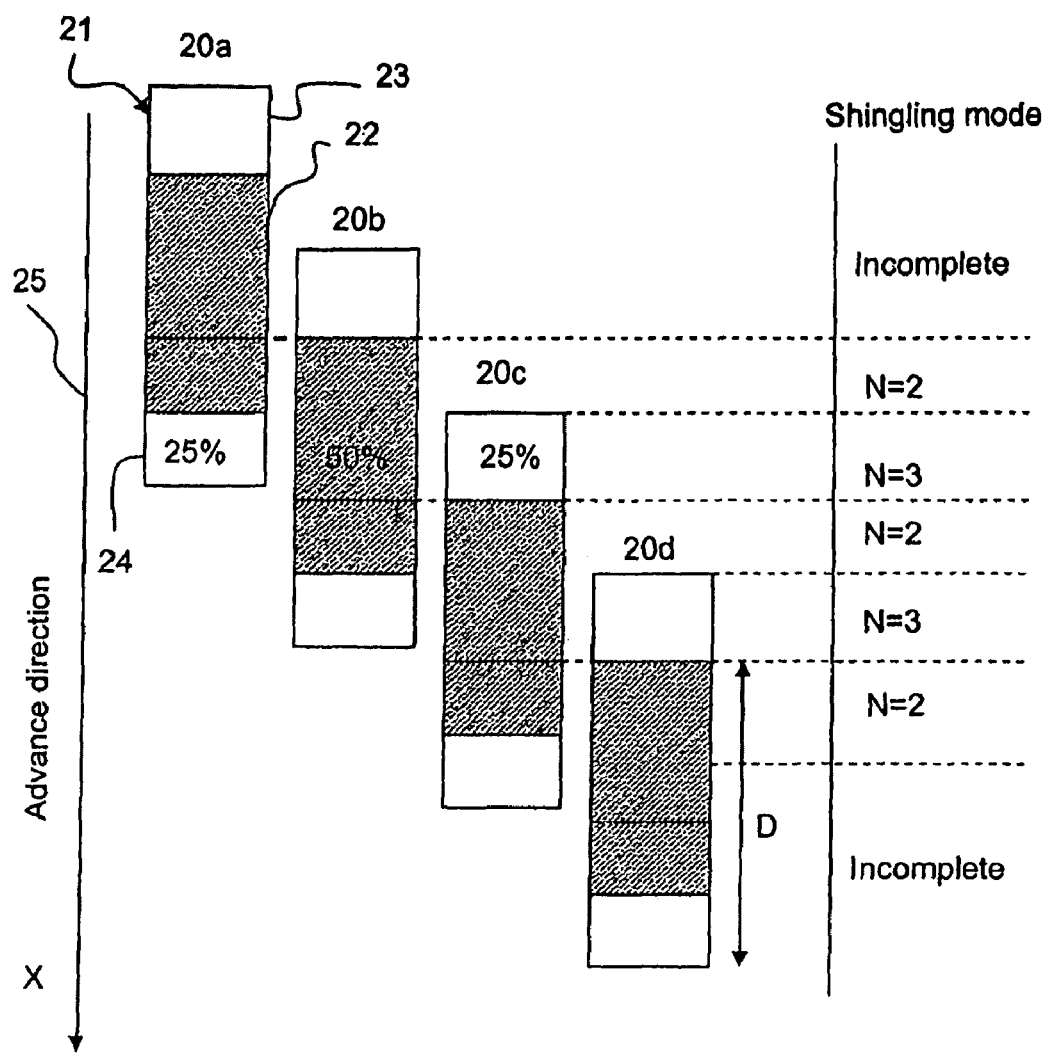
FIG. 5 is a schematic diagram illustrating vertical positions of a nozzle arrangement of a printhead over the printing medium during successive printing passes for an "anti-banding" shingling method.

An interlaced multi-pass printing mode as that described in Example 1 is considered, with the difference that herein an uneven print medium advance sequence is selected. Three complementary print masks as those given in (8) are defined. A standard method of random shuffling selects vector $\omega$ to be $\omega=\{2,3,5,4,1,6\}$. From Eq. (4) and Eq. (7), the sequence of print medium advances and the sequence of mask indices is determined to be: $a=\{44,43,44,41,39,37\}$ and $\alpha=\{1,2,3,2,1,3\}$ One problem that comprises accurate dot placement is swath height errors of the inkjet printhead. Swath height errors are commonly produced by mechanical defects in the substrate of the printhead and can produce erroneous dot placement artifacts, such as ink drops are ejected at an angle to a printing medium rather than perpendicularly thereto. Since the majority of defective nozzles tend to be present mostly at the ends of the printhead, a way of reducing the effect of swath height errors, i.e., to minimize banding, is to apply a multi-pass mode of printing where different shingling modes are applied in different parts of the printhead. FIG. 5 is a schematic diagram illustrating four vertical positions 20*a-d* of the nozzle arrangement 21 of a printhead over the printing medium during successive printing passes. The nozzle arrangement of height H is divided into three nozzle sections: a central section 22 (dashed area); an upper section 23 and a lower section 24. "Upper" section and "lower" section are referred with respect to the direction of advancement of the printing medium indicated by arrow 25. A "virtual" printhead is defined as the sum of the central region 22 and the lower region 24 and has height $D=(Z-O)$. Between each pass, the printhead is advanced by a distance D/2 that is equal to half of the height of the virtual printhead. A shingling mode N=2 is applied to the central nozzle section 22, whereas a shingling mode N=3 is applied to the upper and the lower nozzle sections. Given a printing density of 100% for the image bitmap, the nozzles of the central section 22 print with a printing density of 50%, whereas the nozzles of the upper and lower sections print with a printing density 25% each.

Although the example of FIG. 5 is referred to a two-pass shingling mode, three- or four-passes shingling modes follow the same principle. In general, the nozzle arrangement of a printhead is divided into three nozzle sections regions, i.e., a central, an upper and a lower nozzle section, and if a shingling mode N is employed for part of the central nozzle section, a shingling mode N+1 is employed for the upper and the lower nozzle sections. It follows that when using an "anti-banding" multi-pass printing method, the shingling mode associated to the creation of an image bitmap is generally not the same through the document, i.e., different raster lines are completed with a different number of passes, namely an image bitmap will have raster lines which are printed with shingling mode N and raster lines which are printed with shingling mode (N+1).

Since the advance of the printhead is calculated for a virtual printhead that has a height which is smaller than the actual height of the printhead, a main drawback of the anti-banding shingling mode described above is that the printing speed is necessarily reduced. Accuracy in the print medium advance mechanism during printing is important for print quality. Poor pass-to-pass advance accuracy may produce a clearly visible banding effect on the printed image.

The Applicant has noticed that a multi-pass printing method such that described with reference to FIG. 5 is very useful in reducing the banding effect caused by errors in advances of the print medium, whereas it can be almost ineffectual in reducing the visible effects due to dot placement errors in the direction of advance of the print medium, which are typically caused by deviations in the ink trajectory of the nozzles of the ends of the printhead with respect to the direction of the ink trajectory of the central nozzles. In other words, if the banding effect is produced by mechanical advance errors, a shingling method as that described with reference to FIG. 5 improves the print quality with respect to a "standard" shingling method as described with reference to FIG. 1, whereas no significant improvement of the print quality has been observed in case of banding effect is due to directionality errors of the nozzles.

Figure 6A:
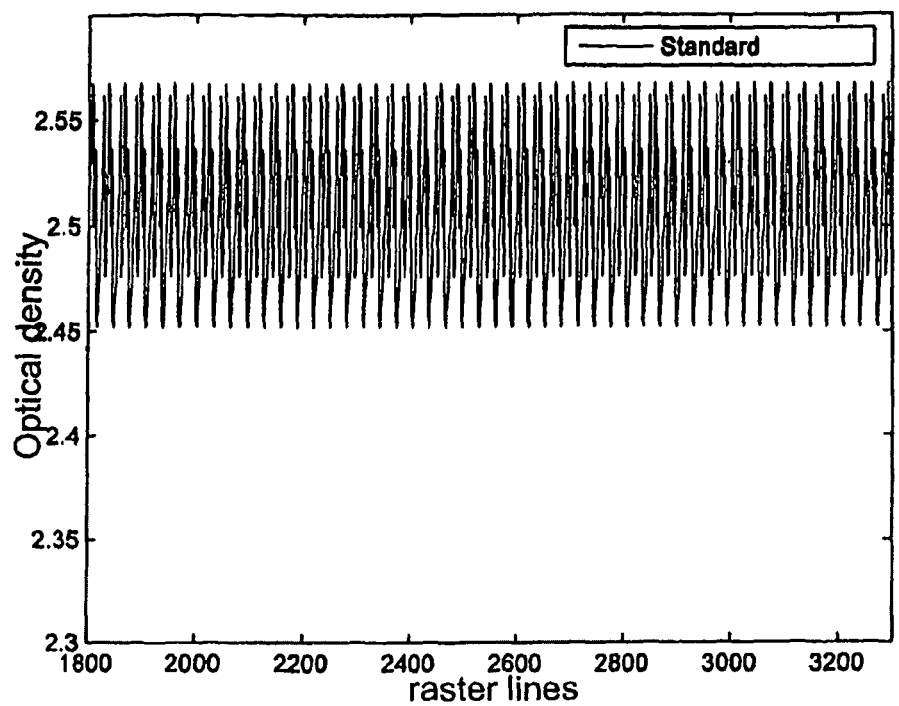
FIGS. 6a and 6b show results from computer simulations of the optical density as a function of the printed lines wherein a random error in the ink dot position has been added for all nozzles. The simulated optical density profile of FIG. 6a is obtained by using a "standard" shingling, whereas the optical density profile of FIG. 6b is obtained by using an "anti-banding" shingling.
Figure 6B:
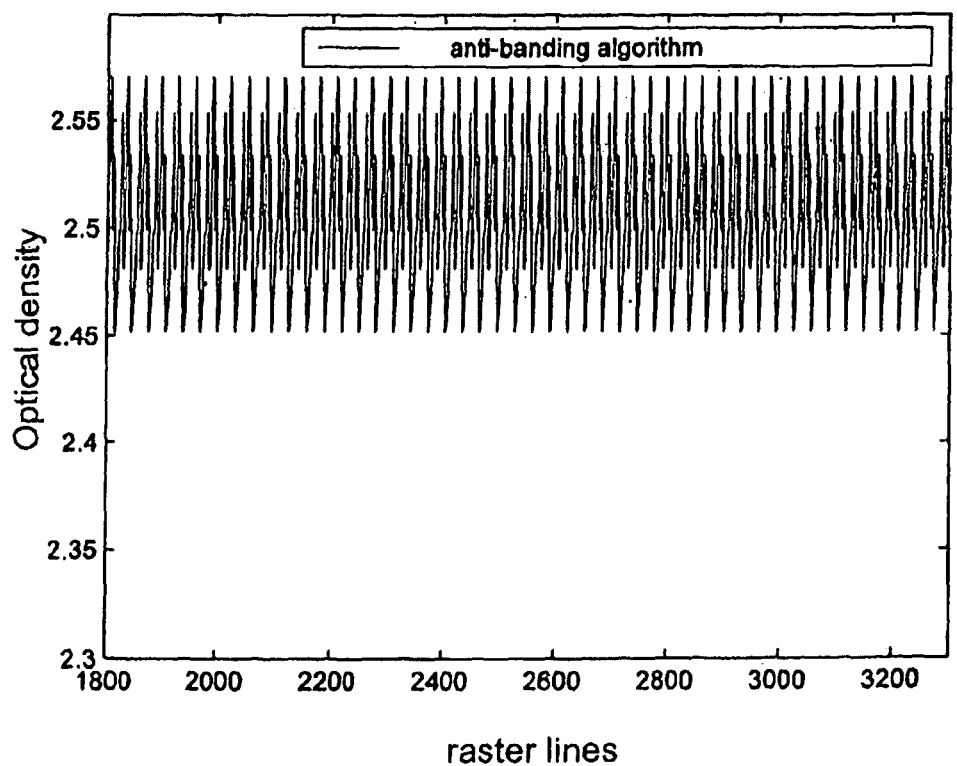

FIGS. 6a and 6b show results from computer simulations of the optical density as a function of the printed lines for 130 nozzles arranged along a vertical axis parallel to the advance direction of the print medium, wherein a random error having a mean value of zero and a standard deviation of $0.2 \cdot R_{doc}$ in the ink dot position has been added for all nozzles. The simulated optical density profile of FIG. 6a is obtained by using a "standard" shingling of mode N=4, whereas the optical density profile of FIG. 6b is obtained by using an anti-banding shingling of N=4 and N=5. In computer simulations reported in FIG. 6b, the end regions of the printhead have 6 nozzles each. It can be observed that the optical density profiles that are calculated by using the two different shingling methods are rather similar and thus no significant beneficial contribution can be observed from the application of the anti-banding shingling method as described with reference to FIG. 5.

The Applicant has considered the use of an anti-banding shingling mode by selecting a set of print masks, wherein each print mask is associated to a swath, i.e., to all pixel locations of the image bitmap.

According to a preferred embodiment, the present invention relates to a multi-pass printing process for banding reduction using a printhead having Z printing nozzles arranged along a vertical direction, wherein two end regions of the printhead prints with a reduced printing density with respect to the printing density of the remaining region of the printhead.

Preferably, the printhead comprises an upper nozzle section, a central nozzle section and a lower nozzle section (i.e., two end regions are defined). With reference to FIG. 5, if O is the number of nozzles of the upper section 23 and the number of nozzles in the lower section 24, the central nozzle section has (Z−2·O) nozzles. A shingling mode N is used in all parts of the document which are printed only with the central section of the printhead. A shingling N+1 is applied in all parts of the document which are printed with both the central section and the end regions of the printhead.

For an "anti-banding" shingling mode N, a set of N print masks is created, wherein for each print mask the j-th row of the print mask corresponds to the j-th nozzle. The binary print mask, $F_i$ (i=1, 2, ... N), associated to each swath is illustrated in FIG. 7 and comprises three mask sections, namely an upper, a central and a lower mask section, which correspond to the nozzle sections of the printhead, respectively. The upper and the lower mask sections of print mask, $F_i$, have O rows each, whereas the central mask section has (Z−2·O) rows. The central mask section of the mask grid of FIG. 7 has only one column every N containing "1" elements corresponding to enabled pixel positions, i.e., for every N mask columns, (N−1) columns are free of data. In the upper and lower mask sections, one column every 2N columns contains "1" mask elements, i.e., every 2N columns, (2N−1) columns are free of data.

Within the set of print masks, $F=\{F_1, F_2, \ldots F_N\}$, the central mask section of (Z−2·O) rows of the masks have to be complementary and the sum of both end regions, of O rows each, of the N masks have to be complementary so that after N swaths the image bitmap is fully printed.

In order to deposit the required amount of ink in all pixel locations of the image bitmap in M passes, the following conditions should be satisfied:

a3) between each pass, the print medium is advanced by a distance $a_m$ (m=1,2, ... M) selected so that the sum of the M advances is equal to the height of a "virtual" printhead having (Z−O) nozzles expressed in the document resolution, namely $$\sum_{m=1}^{M} a_m = (Z - O) \cdot R \qquad (9)$$

b3) after completion of M-passes, each line of the image bitmap (i.e, the raster line) has been printed in N or (N+1) passes by using N different masks, $F_1$ to $F_N$, in any order. If a raster line has been printed with (N+1) passes, this implies that one of the N print masks has been used twice.

The sequence of advances $a'=\{a'_1, \ldots, a'_M\}$ is the solution of the following matrix equation $$a' = D \cdot (z' + \omega) \qquad (10)$$

wherein D is the M×M matrix of Eq. (5), $\omega_m = m$ with m=1,2, ... M, and z' a vector of elements expressed by $$z'_m = \left\lfloor \frac{(Z - O)}{N} m - m \right\rfloor \qquad (11)$$

The set of mask indices, $\alpha_m$, is given by Eq. (7).

At pass m, a swath is printed by using print mask $F_{\alpha_m}$ and, when the swath is completed, the print medium is advanced by a distance $a'_m$.

EXAMPLE 3

An interlaced multi-pass printing mode having N=3 and R=2 and using a printhead comprising at least a column of 129 writing nozzles (Z=129) is considered. The number O of the nozzles of the end regions is 9. An even print medium advance is considered, where m=1,2, ... , 6. Three complementary print masks, $\{F_1, F_2, F_3\}$, each of 129 rows, are defined and reported in FIG. 8. The 9 first rows and the last 9 rows of $F_i$ (i=1,2,3) corresponding to the nozzles of the end regions of the printhead contribute only to a shingling mode N+1, while the remaining 111 rows contribute to both shingling modes N and N+1.

With reference to Eq. (4), $\omega=\{1,2,3,4,5,6\}$. By applying Eq. (9) the vector representing the set of advances necessary to print the image bitmap is $a=\{40,40,40,40,40,40\}$. By applying Eq. (7), the vector representing the mask indices, $\alpha_m$, is $\alpha=\{1,1,2,2,3,3\}$.

Figure 9:
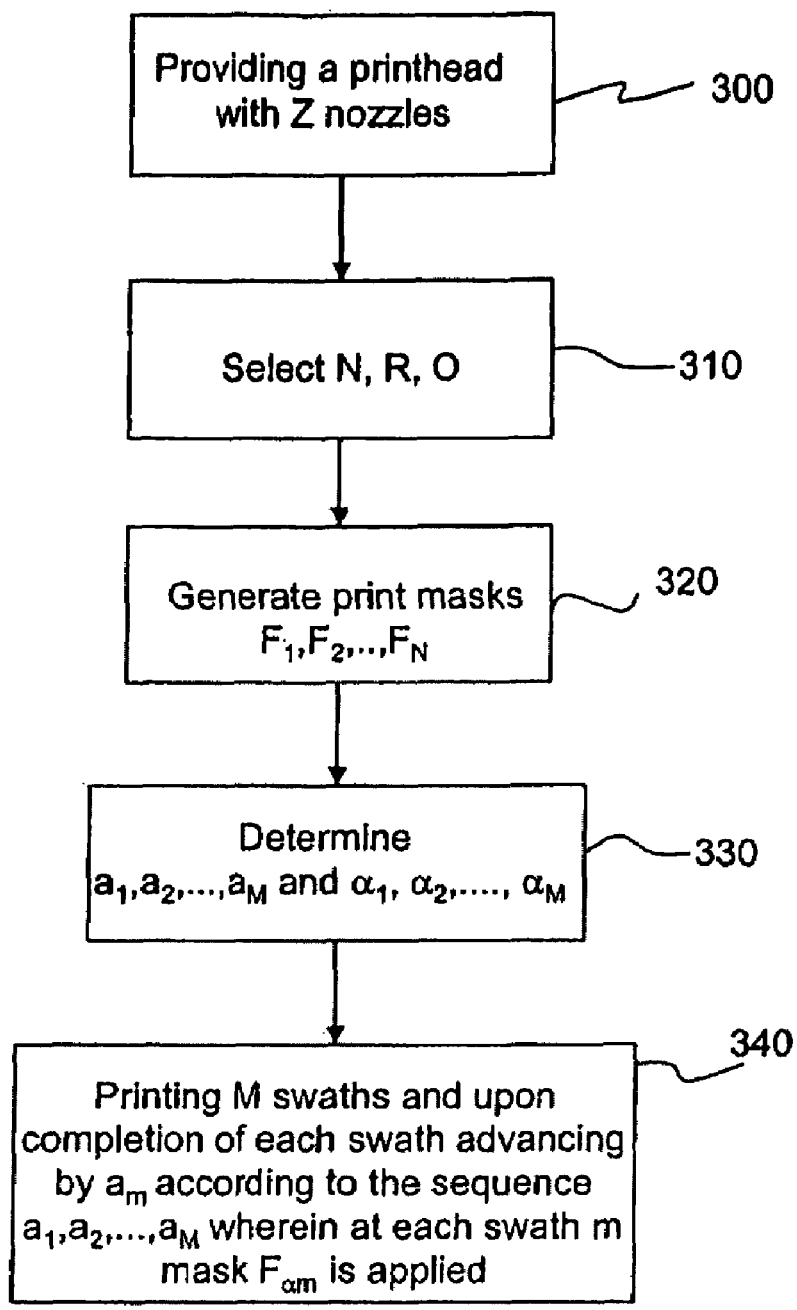
FIG. 9 is a flow chart of a method of printing according to an embodiment of the present invention.

FIG. 9 is a flow chart of a method of printing ink drops configured to form an image bitmap on a print medium in a plurality of M printing passes, each pass corresponding to one swath printed on said print medium, said method comprising the steps of:

Step 300: providing a printhead including at least one nozzle array that comprises Z nozzles substantially arranged along a vertical direction (X);

Step 310: selecting a shingling mode N and a document resolution R so as to determine the number of passes M=N·R necessary to form said image bitmap. Preferably, a number O of nozzles belonging to each of the end regions of the nozzle array is defined;

Step 320: generating N print masks $F_1, F_2, \ldots F_N$, wherein each print mask is associated to one swath and the N masks are complementary so that application of N masks produces an image bitmap having a printing density of 100%. Preferably, each print mask is defined as a mask grid being arranged in a series of horizontally extending mask rows and in a series of enabling mask columns and of disabling mask columns, wherein said enabling mask columns are spaced one another by (N−1) adjacent disabling mask columns.

Step 330: determining a sequence of M advances, $a_1, \ldots, a_M$, of the print medium relative to the printhead between each pass along a vertical advance direction so that the sum of the M advances is equal to Z·R document lines. If end regions are defined for said printhead, the sum of the M advances is equal to (Z−O)·R document lines Step 330 comprises also determining a sequence of mask indices $\alpha_1, \ldots, \alpha_M$ so that at pass m, a swath is printed by using print mask $F_{\alpha_m}$.

Step 340: printing a sequence of M swaths and upon completion of printing of each swath m advancing the print medium relative to the printhead by one advance $a_m$ of said sequence of M advances, wherein at each swath m the print mask $F\alpha_m$ is applied so that upon completion of printing of the M swaths each of the N masks is applied R times. According to a preferred embodiment, each mask $F\alpha_m$ includes O first rows and O last rows, which correspond to the nozzles of the end sections of the printhead (i.e., upper and lower nozzle sections), wherein the enabled pixel locations are spaced one another by (2N−1) disabled pixel locations, while in the remaining (Z−2O) rows enabled pixel locations are spaced one another by (N−1) disabled pixel locations.

Figure 10:
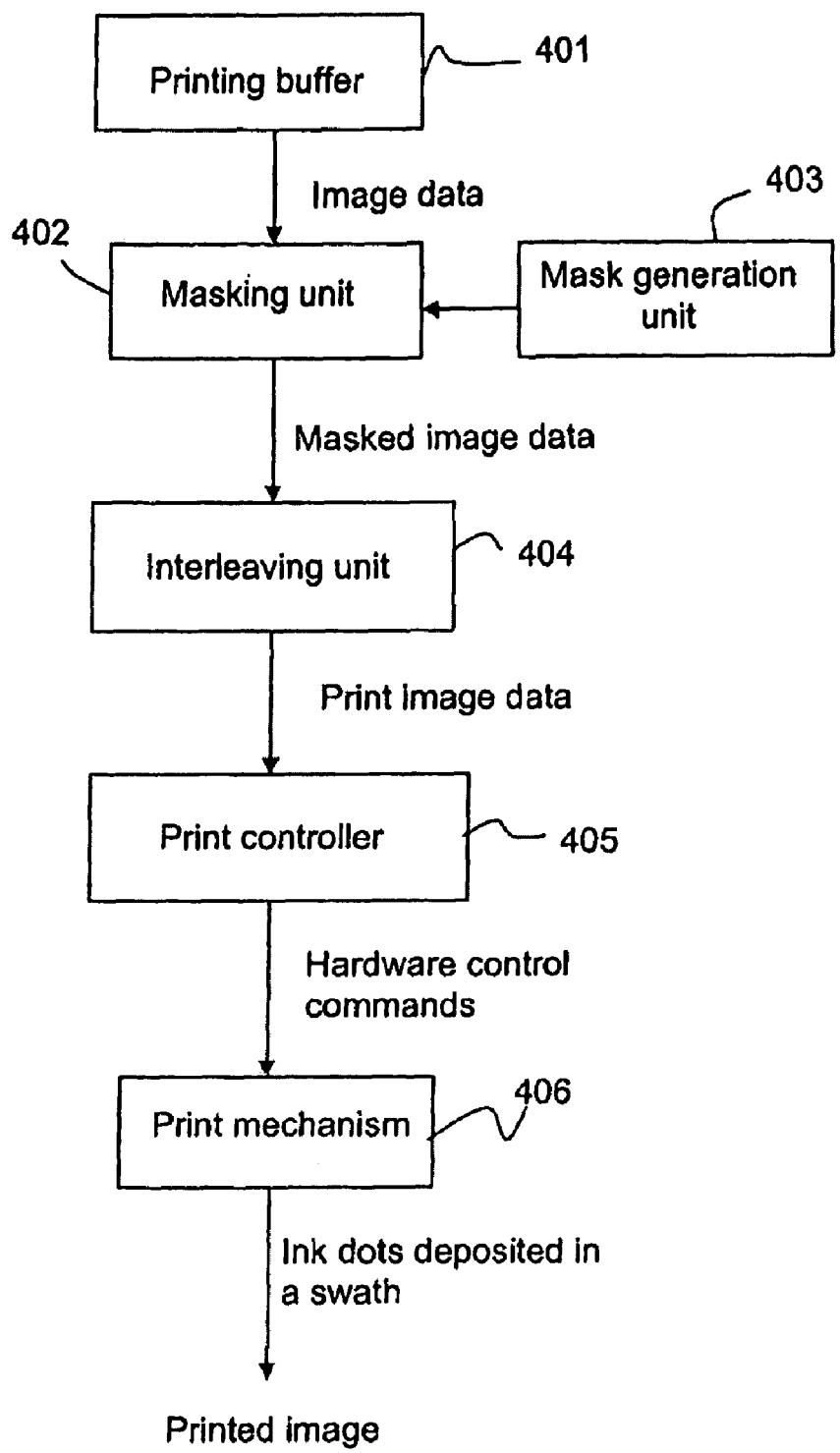
FIG. 10 is a block diagram illustrating a multi-pass printing process according to another embodiment of the present invention.

FIG. 10 is a block diagram illustrating a multi-pass printing process according to a preferred embodiment of the present invention. Input image data, in the form of a two-dimensional array and corresponding to a portion of the image bitmap to be printed in one swath (i.e., a pass), is output from a printing buffer 401, where it is stored, to a masking unit 402 as the printhead moves along with the carriage. Within this context, an image bitmap refers to as the final printed image after N (or M) swaths. It is to be understood that if color printing is considered, the printing process may process separately input image data of different colors (cyan, magenta and yellow) so as to form an image bitmap of color ink.

A mask generation unit 403 applies a print mask $F_i$ to the image input data. In practice, the masking unit 402 calculates the logical product (AND operation) of the input image data read out from the printing buffer and the print mask from the mask generation unit and transfers the calculation result, i.e., the masked image data, to an interleaving unit 404. The masked image data are represented by a two-dimensional binary data array where only one column over N contains pixel locations to be printed. Unit 404 performs on the masked image data an operation referred to as the interleaving operation. The interleaving operation removes, the "empty" data columns of the masked image data and generates print image data represented by a two-dimensional data array where all print data columns contain pixel locations to be printed. The data array representing the print image data has a number of print data columns which is N times smaller than the number of columns of the masked image data read out from the masking unit 402. Of course, whether or not an ink dot will be actually printed on a pixel location depends on whether the image bitmap to be printed requires that an ink dot of a certain ink color in that pixel position. Therefore, the print data columns of the print image data may contain also "0" values.

The print image data are sent to the print controller 405 that controls the movement of the carriage on which the printhead or printheads are mounted (i.e., it controls the movement along the scan direction), the advance of the print medium relative to the printhead(s) along the advance direction and the actuating signals for activating the nozzles of the printhead(s) for ink drop ejection. The print controller 405 sends the hardware control commands to a print mechanism 406. In particular, the print controller commands through the print mechanism the trigger signals to be transmitted to the nozzle array(s) at time intervals, Δt, and the carriage to move at a printing speed such that the distance along the scan direction (i.e., along the raster line) between an addressed pixel location of the image bitmap and the successive addressed pixel location is N times the distance between addressed pixel locations of a raster line of the image bitmap upon completion of the printing of N swaths.

According to a preferred embodiment, the print controller informs the print mechanism that the print image data should be printed with an horizontal resolution N times lower than the document horizontal resolution defined by the shingling mode. For instance, if the document horizontal resolution is 1/600', which corresponds to a pixel column spacing, d, of 1/600' between printed ink dots of a raster line upon completion of printing N swaths, and a shingling mode N=2 is applied, the print controller sets the carriage speed of 1/300' while the sequence of trigger signals can be set with the shortest time interval Δt allowed by the hardware or the nozzle arrangement. For instance, Δt can be set to be between 50 and 60 μs.

After M passes, an image bitmap, i.e., a two-dimensional ink dot array forming the printed image, is outputted from the print mechanism 406 on a print medium.

At each pass m (m=1,2, . . . , M), a swath is printed based on print image data obtained by the application of a print mask, $F_i$ (i=1,2, . . . , N). To fulfill the condition that the N print masks are complementary with respect to the printed image, the enabling mask columns within a print mask are positioned differently from the other (N−1) print masks. For example, in a first print mask, the first enabling mask column within a mask grid is positioned as the first mask column within the series of adjacent mask columns of the grid, in a second print mask the first enabling mask column is positioned as a second mask column, etc. In general, for a print mask $F_i$ the first enabling mask column is positioned at mask column (i−1) (e.g., Eq. (2) and Examples). After application of the N masks to the M input image data and removal of the empty data columns, the resulting M print image data will have only columns containing enabled pixel locations. At the start of the printing of a swath m, the printhead needs to be correctly positioned with respect to the other swaths that have to be printed or that have been printed so that ink dot columns are printed at a correct position on the print medium while the printhead moves across the print medium. At each swath, print data columns are spaced by N·d, where d is the pixel column spacing between adjacent pixel columns after printing of M passes. Since it is preferred that the sequence of trigger signals has the same time interval, $\Delta t$, for each printing pass m, it is necessary to offset the starting time of the sequence of trigger signals for a print mask $F_i$ by a time interval of $$\frac{\Delta t}{N} \cdot (i-1), i = 1, 2, \ldots N. \tag{11}$$

It is emphasized that since the empty data columns do not contain pixel locations to be filled with ink dots during printing, it is not necessary to send them to the print controller. Considering that any data column of the print image data read out by the print controller needs to be addressed by a strobe signal through a printhead driver (in FIG. 10, the driver(s) are considered to be included in the print mechanism 406), removal of the empty columns from the image data to be printed allows the printing of a raster line by using a much smaller array of image data (e.g., a factor of 2 smaller than the input image data for shingling mode N=2). Since generally the time interval between successive fire signals is selected to be the maximum firing rate of the printhead and it cannot easily be reduced due to hardware constraints or to staggering layout, it follows that the printing process outlined in FIG. 10 can allow an increase of the printhead speed by a factor N.

The Applicant has observed that in a printer using the method of printing according to the present invention a high print quality is ensured even at carriage speeds which can be typical of a low "draft" horizontal resolution. When applying an anti-banding shingling mode according to a preferred embodiment of the present invention, the Applicant has found that a significant improvement of the print quality with a substantial reduction of the banding effect is achieved also in the presence of dot placement errors in the printhead.

The invention claimed is:

1. A method of printing from a printhead comprising a nozzle array for forming an image bitmap as ink drops on a print medium, said nozzle array being arranged substantially along a vertical advance direction of the print medium relative to the printhead, said nozzle array having a height of Z nozzles through which ink is ejected onto the print medium, said image bitmap being arranged in a pixel grid defining a series of vertically extending adjacent pixel columns and a series of horizontally extending raster lines, said adjacent pixel columns being horizontally spaced apart by a pixel column spacing, d, wherein raster lines are printed in a plurality of printing passes, each printing pass corresponding to one swath printed on said print medium, said method comprising the steps of:
 a) virtually dividing said nozzle array having an height of Z nozzles in at least one first nozzle section and at least one second nozzle section, wherein said at least one first nozzle section comprises a number of nozzles smaller than the number of nozzles of the second nozzle section;
 b1) providing N print masks associated to said at least one first nozzle section and to said at least one second nozzle section governing the deposition of the ink drops on the print medium, each of said N print masks being associated to one swath and being defined as a mask grid of first mask elements corresponding to pixel locations enabled for printing and second mask elements corresponding to pixel locations disabled from printing, said mask grid being arranged as a series of vertically extending adjacent mask columns and a series of horizontally extending mask rows, said vertically extending mask columns comprising enabling mask columns comprising the first mask elements and disabling mask columns consisting essentially of the second mask elements;
 b2) providing input image data corresponding to the image bitmap to be printed in said plurality of printing passes;
 c) providing said N print masks associated to said at least one first nozzle section and to said at least one second nozzle section for printing said input image, each of said print masks being defined as mask grid arranged in a N series of vertically extending adjacent mask columns and a series of Z horizontally extending mask rows, said series of mask rows being divided in at least two adjacent mask sections, a first mask section and a second mask section corresponding to said at least one first nozzle section and to said at least one second nozzle section respectively wherein the mask rows of said at least one second mask section are arranged spaced from one another by N−1 adjacent second mask elements and the mask rows of said at least one first nozzle section are arranged spaced from one another by 2N−1 adjacent second mask elements within the same mask row;
 d) performing an interleaving logical operation on said masked image data comprising removing the masked data columns of said masked image data essentially consisting of disabled pixel locations so as to create print image data arranged in a two-dimensional data array defined as a series of print data columns containing pixel locations enabled for printing;
 e) printing said first swath based on said print image data by providing a sequence of trigger signals having a time interval between signals of $\Delta t$ for initiating firing of the nozzle array as said printhead moves horizontally over said print medium along a scan direction at an average printhead speed of $N \cdot d / \Delta t$ to deposit ink drops onto pixel columns containing enabled pixel locations;
 f) advancing the print medium relative to the printhead along a vertical advance direction substantially orthogonal to the scan direction; and
 g) continuing printing of the swaths repeating the requirements of steps b) to f) until said pixel grid has been printed on said print medium.

2. The method of claim 1, wherein the pixel grid has a printing density of 100% and said N printing masks have a complementary printing density so that upon completion of said plurality of printing swaths said 100% printing density is achieved.

3. The method of claim 1, wherein in step f) the print medium advances uneven distances between passes.

4. The method of claim 1, wherein after formation of the image bitmap raster lines of said pixel grid are printed in (N+1) printing passes by the nozzles comprised in said at least one first nozzle section.

5. The method of claim 1, wherein after formation of the image bitmap raster lines of said pixel grid are printed in either N+1 or N printing passes by the nozzles comprised in said at least one second nozzle section.

6. The method of claim 1, wherein said nozzle array comprises Z nozzles being vertically spaced apart by a pitch (p) defining a vertical resolution of the printhead ($R_{head}$), the method further comprising, before step b1), the step of selecting a vertical resolution of the image bitmap ($R_{doc}$) larger than the vertical resolution of the printhead ($R_{head}$), wherein
 step f) comprises advancing the print medium by a first distance equal to a non-integer number of said pitch (p), and
 step g) of continuing printing of the swaths is carried out until M swaths have been printed on said print medium, where M=N·R, with R being the ratio between vertical resolution of the image bitmap ($R_{doc}$) and the vertical resolution of the printhead ($R_{head}$) so as to form said image bitmap by depositing ink drops along said adjacent pixel columns in a plurality of M passes.

7. A method of printing ink drops for forming an image bitmap as ink drops on a print medium, said image bitmap being arranged in a pixel grid defining a series of vertically extending adjacent pixel columns and a series of horizontally extending raster lines, said adjacent pixel columns being horizontally spaced apart by a pixel column spacing, d, each printing pass corresponding to one swath printed on said print medium, the method comprising the steps of:

provshowing a printhead comprising a nozzle array of height of Z nozzles;

selecting a number of printing passes N for printing said raster lines with at least N different nozzles and selecting a relative vertical resolution, R, so as to define the number of passes M=N·R necessary to complete printing of said image bitmap;

generating N print masks, $F_i$ (i=1,2, . . . , N), each print mask being associated to one swath and having a printing density such that upon completion of printing of M passes each raster line has been printed in at least N passes by using N different print masks and being defined as a mask grid of first mask elements corresponding to pixel locations enabled for printing and second mask elements corresponding to pixel locations disabled from printing, said mask grid being arranged in a series of horizontally extending mask rows and in a series of enabling mask columns comprising first mask elements and of disabling mask columns essentially consisting of second mask elements;

virtually dividing said nozzle array in at least one first nozzle section and at least one second nozzle section, wherein the at least one first nozzle section comprises a number of nozzles smaller than the number of nozzles of the at least one second nozzle section, wherby said at least one first nozzle section comprise a number O of nozzles smaller than Z/2 and said at least one second nozzle section comprises a number Z–O of nozzles, and wherein the mask grid of each of said N print masks is arranged as a series of Z horizontally extending mask rows, said series of mask rows being divided in at least two adjacent mask sections, a first mask section and a second mask section, corresponding to said first and second nozzle sections respectively, wherein the mask rows of said at least one second mask section are arranged so that are spaced one another by N–1 adjacent second mask elements and the mask rows of said at least one first nozzle section are arranged so that are spaced one another by 2N–1 adjacent second mask elements within the same mask row;

determining a sequence of M advances, $a_m$ (m=1,2, . . . , M), along a vertical advance direction between each of said M passes;

determining a sequence of M print mask indices, $\alpha_m$ (m=1, 2, . . . , M), each print mask index being associated to one of said N print masks and the sequence being such that each of said N print masks is present R times in the sequence, and printing a sequence of M swaths, wherein at each swath m (m=1,2, . . . , M)

one print mask with mask index $\alpha_m$ is applied, and after printing each m swath, the print medium is advanced by $a_m$.

8. The method of claim 7, wherein the step of printing a sequence of M swaths at each swath m (m=1,2, . . . , M) further comprises the step of providing a sequence of trigger signals having a time interval between signals of $\Delta t$ for initiating firing of said nozzle array as said printhead moves horizontally over said print medium along a scan direction at an average printhead speed of $N \cdot d/\Delta t$ to deposit ink drops onto pixel columns containing enabled pixel locations.

9. The method of claim 7, wherein the sequence of advances is selected so that the sum of M advances is equal to $(Z-O) \cdot R$ raster lines.

10. The method of claim 7, wherein said sequence of M advances is an irregular sequence.

* * * * *